US011552661B2

United States Patent
Korpi et al.

(10) Patent No.: US 11,552,661 B2
(45) Date of Patent: Jan. 10, 2023

(54) INTERFERENCE DETECTION IN RADIO ACCESS NETWORK

(71) Applicant: Nokia Solutions and Networks Oy, Espoo (FI)

(72) Inventors: Dani Korpi, Helsinki (FI); Mikko Uusitalo, Helsinki (FI); Janne Huttunen, Espoo (FI); Leo Karkkainen, Helsinki (FI); Mikko Honkala, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/487,062

(22) Filed: Sep. 28, 2021

(65) Prior Publication Data

US 2022/0103198 A1 Mar. 31, 2022

(30) Foreign Application Priority Data

Sep. 29, 2020 (FI) ..................................... 20205941

(51) Int. Cl.
*H04B 1/10* (2006.01)
*H04B 7/0413* (2017.01)
*H04L 25/03* (2006.01)

(52) U.S. Cl.
CPC ......... *H04B 1/1027* (2013.01); *H04B 7/0413* (2013.01); *H04L 25/03006* (2013.01)

(58) Field of Classification Search
CPC ................ H04B 1/1027; H04B 7/0413; H04L 25/03006
See application file for complete search history.

(56) References Cited

U.S. PATENT DOCUMENTS

2015/0003509 A1* 1/2015 Faber .................... H04L 25/022
375/232
2015/0280888 A1* 10/2015 Karsi ................... H04B 7/0413
370/329

(Continued)

FOREIGN PATENT DOCUMENTS

WO WO 2019/088890 A1 5/2019
WO WO 2020/069090 A1 4/2020

OTHER PUBLICATIONS

Habibi, M.A., et al., "A Comprehensive Survey of RAN Architectures Toward 5G Mobile Communication System", © 2019 IEEE, 51 pgs.

*Primary Examiner* — Janice N Tieu
(74) *Attorney, Agent, or Firm* — Harrington & Smith

(57) ABSTRACT

This document discloses a solution for detecting interference in a radio access network. According to an aspect, a method includes as performed by a network node of the radio access network: acquiring a first equalized signal representing a signal received by a first radio head serving a terminal device, the first equalized signal including a signal received by the first radio head from the terminal device; acquiring a second equalized signal representing a signal received by a second radio head not serving the terminal device, wherein the second radio head is spatially distant from the first radio head; cross-correlating the first equalized signal with the second equalized signal and determining, on the basis of said cross-correlating, whether or not the second equalized signal also includes a signal received from the terminal device; and as a result of the second equalized signal being determined to include the signal received from the terminal device, causing execution of an interference management action.

15 Claims, 7 Drawing Sheets

(56) References Cited

U.S. PATENT DOCUMENTS

| | | |
|---|---|---|
| 2015/0303950 A1 | 10/2015 | Shattil |
| 2015/0341802 A1 | 11/2015 | Chiang et al. |
| 2016/0322995 A1* | 11/2016 | Bevan ................... H04B 1/10 |
| 2017/0214429 A1 | 7/2017 | Eistein et al. |
| 2018/0070254 A1 | 3/2018 | Hannan et al. |
| 2018/0287828 A1 | 10/2018 | Tavares et al. |
| 2019/0058534 A1 | 2/2019 | Anderson |
| 2020/0120458 A1 | 4/2020 | Aldana et al. |

* cited by examiner

INTERFERENCE DETECTION IN RADIO ACCESS NETWORK

FIELD

Various embodiments described herein relate to the field of wireless communications and, particularly, to detecting interference in a radio access network.

BACKGROUND

In a modern radio access network, radio coverage to served (mobile) terminal devices is provided in the form of a network of radio access nodes that are in some literature called base stations, Nodes B, etc. With the latest evolution versions of the cellular networks, a concept where a single access node has multiple spatially distant remote radio heads (RRH). A single access node or a RRH may serve a particular terminal device and is, thus, configured to process signals received from the terminal device. The other access nodes or RRHs may see any signal received from the terminal device as interference.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a network node of a radio access network, comprising means for performing: acquiring a first equalized signal representing a signal received by a first radio head serving a terminal device, the first equalized signal comprising a signal received by the first radio head from the terminal device; acquiring a second equalized signal representing a signal received by a second radio head not serving the terminal device, wherein the second radio head is spatially distant from the first radio head; cross-correlating the first equalized signal with the second equalized signal and determining, on the basis of said cross-correlating, whether or not the second equalized signal also comprises a signal received from the terminal device; and as a result of the second equalized signal being determined to comprise the signal received from the terminal device, causing execution of an interference management action.

In an embodiment, the network node is an access node, and the first radio head and the second radio provide the access node with a spatially distributed multiple-input-multiple-output communication capability.

In an embodiment, said determining comprises determining whether or not the same signal transmitted by the terminal device is received in the first radio head and in the second radio head.

In an embodiment, the first equalized signal is other than a reference signal.

In an embodiment, the first radio head is synchronized with the second radio head and the means are configured to preform said cross-correlating by computing a dot product between the first equalized signal and the second equalized signal.

In an embodiment, the means are configured to compare a magnitude of a result of said cross-correlating with a threshold value and perform said determining on the basis of said comparing, wherein if the magnitude is greater than the threshold, the means are configured to determine that second equalized signal also comprises the signal received from the terminal device.

In an embodiment, said terminal device is a first terminal device, wherein the second equalized signal comprises a signal received by the second radio head from a second terminal device served by the second radio head, and wherein the means are further configured to: decoding the second equalized signal and, after said decoding, reconstructing a signal transmitted by the second terminal device; subtracting the reconstructed signal from the second equalized signal; and performing said cross-correlating between the reconstructed signal and the first equalized signal.

In an embodiment, the means are configured to determine, by using error detection, whether or not the decoding results in residual error and to disable said reconstructing upon determining that the decoding results in residual error.

In an embodiment, the means are configured to acquire equalization parameters used when equalizing the signal received by the second radio head, to perform a reverse equalization operation on the second equalized signal by using the equalization parameters, and to perform said cross-correlating between the reverse-equalized signal and the first equalized signal.

In an embodiment, the means comprise at least one processor and at least one memory including computer program code, the at least one memory and computer program code configured to, with the at least one processor, cause the performance of the apparatus.

According to an aspect, there is provided a method for a network node of a radio access network, comprising: acquiring, by the network node, a first equalized signal representing a signal received by a first radio head serving a terminal device, the first equalized signal comprising a signal received by the first radio head from the terminal device; acquiring, by the network node, a second equalized signal representing a signal received by a second radio head not serving the terminal device, wherein the second radio head is spatially distant from the first radio head; cross-correlating, by the network node, the first equalized signal with the second equalized signal and determining, on the basis of said cross-correlating, whether or not the second equalized signal also comprises a signal received from the terminal device; and as a result of the second equalized signal being determined to comprise the signal received from the terminal device, causing by the network node execution of an interference management action.

In an embodiment, said terminal device is a first terminal device, wherein the second equalized signal comprises a signal received by the second radio head from a second terminal device served by the second radio head, and wherein the method further comprises as performed by the network node: decoding the second equalized signal and, after said decoding, reconstructing a signal transmitted by the second terminal device; subtracting the reconstructed signal from the second equalized signal; and performing said cross-correlating between the reconstructed signal and the first equalized signal.

In an embodiment, the method further comprises: acquiring equalization parameters used when equalizing the signal received by the second radio head; performing a reverse equalization operation on the second equalized signal by using the equalization parameters, and performing said cross-correlating between the reverse-equalized signal and the first equalized signal.

In an embodiment, the network node is a Central Unit of specifications of Third Generation Partnership Project, 3GPP.

According to another aspect, there is provided a computer program product embodied on a computer-readable medium and comprising a computer program code readable by a computer, wherein the computer program code configures the computer to carry out a computer process in a network node of a radio access network, the computer process comprising: acquiring a first equalized signal representing a signal received by a first radio head serving a terminal device, the first equalized signal comprising a signal received by the first radio head from the terminal device; acquiring a second equalized signal representing a signal received by a second radio head not serving the terminal device, wherein the second radio head is spatially distant from the first radio head; cross-correlating the first equalized signal with the second equalized signal and determining, on the basis of said cross-correlating, whether or not the second equalized signal also comprises a signal received from the terminal device; and as a result of the second equalized signal being determined to comprise the signal received from the terminal device, causing execution of an interference management action.

LIST OF DRAWINGS

Embodiments are described below, by way of example only, with reference to the accompanying drawings, in which FIGS. 1 and 2 illustrate a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
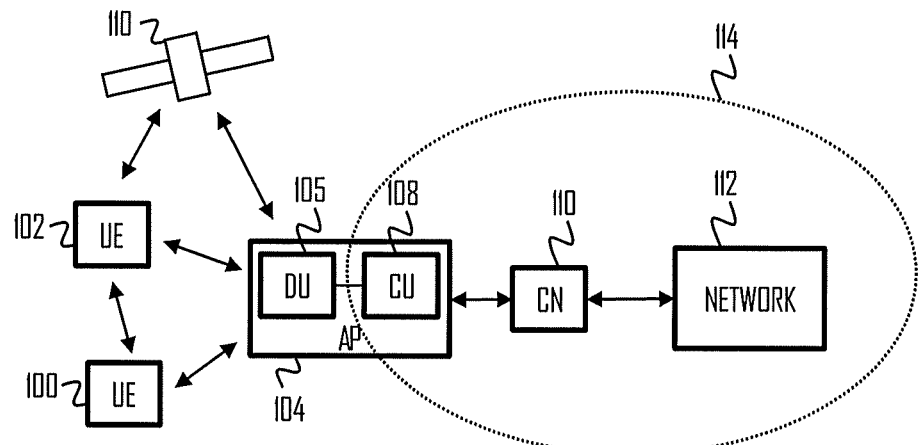

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Figure 2:
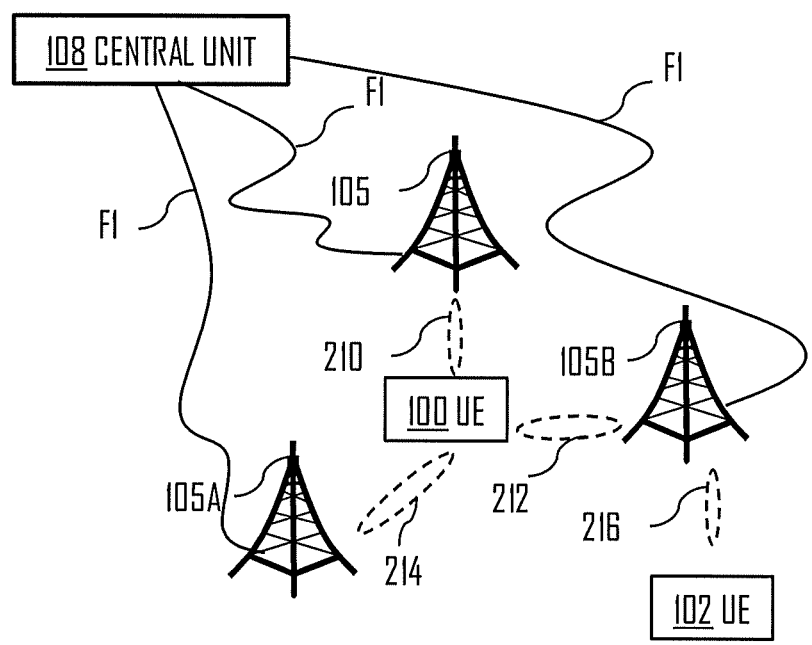

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108). Terminology in the literature may vary but, in some literature, the RRH corresponds to the DU 105. A single CU 108 may have multiple RRHs that are spatially remote with respect to one another, e.g. located at different geographical locations or antenna sites. FIG. 2 illustrates such a scenario where the CU 108 has three RRHs 105, 105A, 105B. An interface between the CU and the RRH (or DU) is F1 interface in the 5G specifications. Such an arrangement enables the CU to employ, for example, spatially distributed multiple-input-multiple-output (MIMO) communications where the CU communicates with different terminal devices simultaneously over the same time-frequency resources via different RRHs. Each RRH may establish a spatial channel to one or more terminal devices served by the RRH, wherein the spatial channel may be substantially orthogonal (or at least distinguishable) with respect to one or more spatial channels formed by one or more other RRHs in the same time-frequency resources. Such a scenario may improve spectral efficiency.

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In a scenario where the RRHs are deployed densely, it is possible that an uplink signal from a given terminal device (100 in FIG. 2) reaches, in addition to a RRH serving the terminal device via link 210, one or more RRHs 105A, 105B that are serving other terminal devices in the same time-frequency resources (links 212, 214). The uplink signal received in a non-serving RRH may be understood as interference because it may degrade reception capabilities of the non-serving RRH for an uplink signal of another terminal device served by the non-serving RRH. Referring to FIG. 2, the embodiments described below investigate the interference from the terminal device 100 to the RRH 105B serving the terminal device 102 but not the terminal device 100. The link 212 is thus the potential source of interference for the link 216. Detection and cancellation of such interference may improve the reception capabilities.

Figure 3:
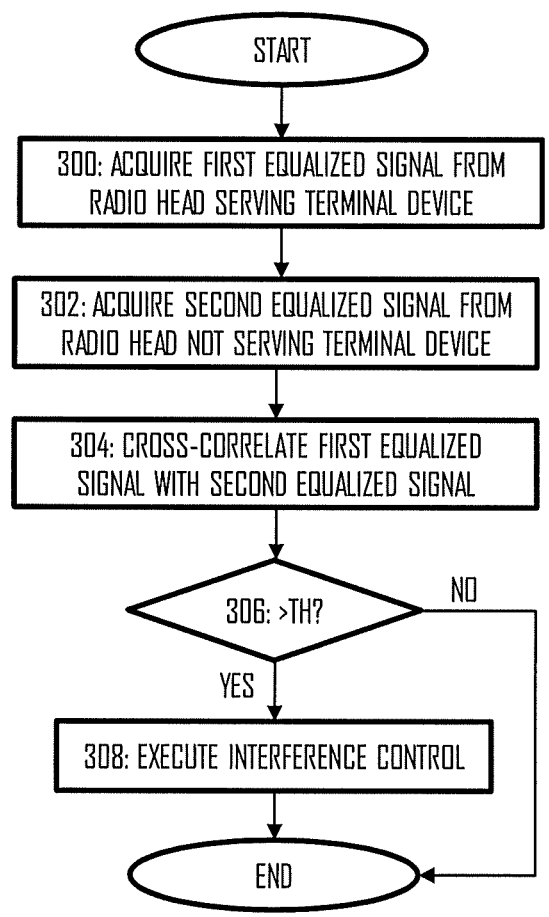
FIG. 3 illustrates a process for determining coverage area(s) of one or more terminal devices served by multiple radio heads in a cell or in a plurality of cells.

FIG. 3 illustrates an embodiment of a process for detecting interfering terminal devices at a network node, e.g. the CU or another access node of a radio access network. Referring to FIG. 3, the process comprises: acquiring (block 300) a first equalized signal representing a signal received by a first radio head serving a terminal device, the first equalized signal comprising a signal received by the first radio head from the terminal device; acquiring (block 302) a second equalized signal representing a signal received by a second radio head not serving the terminal device, wherein the second radio head is spatially distant from the first radio head; cross-correlating (block 304) the first equalized signal with the second equalized signal and determining (306), on the basis of said cross-correlating, whether or not the second equalized signal also comprises a signal received from the terminal device; and as a result of the second equalized signal being determined to comprise the signal received from the terminal device, causing (block 308) execution of an interference management action.

Using the cross-correlation function enables detection of a signal that is received in multiple radio heads (RRHs). The cross-correlation enables the network node to determine whether or not the terminal device causes interference without needing to perform and transmit power measurements or other complex procedures that increase signalling overhead. Cross-correlation may be performed by using the signals that are inherently transmitted over the radio interface for another purpose (signalling and/or data). A similar advantage is the amount of signal samples taken into the cross-correlation may be scaled relatively freely because the signals used in the cross-correlation are not limited to pilot signals or reference signals only. The signal used for the cross-correlation may thus be arbitrarily selected and it may be other than a reference signal or comprise signal(s) other than reference signals.

In an embodiment, said determining in block 306 comprises determining whether or not the same signal transmitted by the terminal device is received in the first radio head (serving the terminal device) and in the second radio head (not serving the terminal device). The terminal device may thus cause interference to the second radio head serving another terminal device in the same time-frequency resources.

In an embodiment, the procedure of FIG. 3 may be used for estimating a coverage area of a given terminal device in terms of which RRHs are capable of detecting the terminal device and which RRHs are not, without any signal power or signal strength measurements.

In an embodiment, the interference management action comprises at least one of the following actions: a handover of the interfering terminal device, changing a beamforming configuration of the interfering terminal device and/or one of the radio heads, changing a transmit power control setting of the interfering terminal device, and switching the interfering terminal device to a multi-connectivity mode where the terminal device is served by the first radio head and the second radio head capable of detecting the terminal device.

Figure 4:
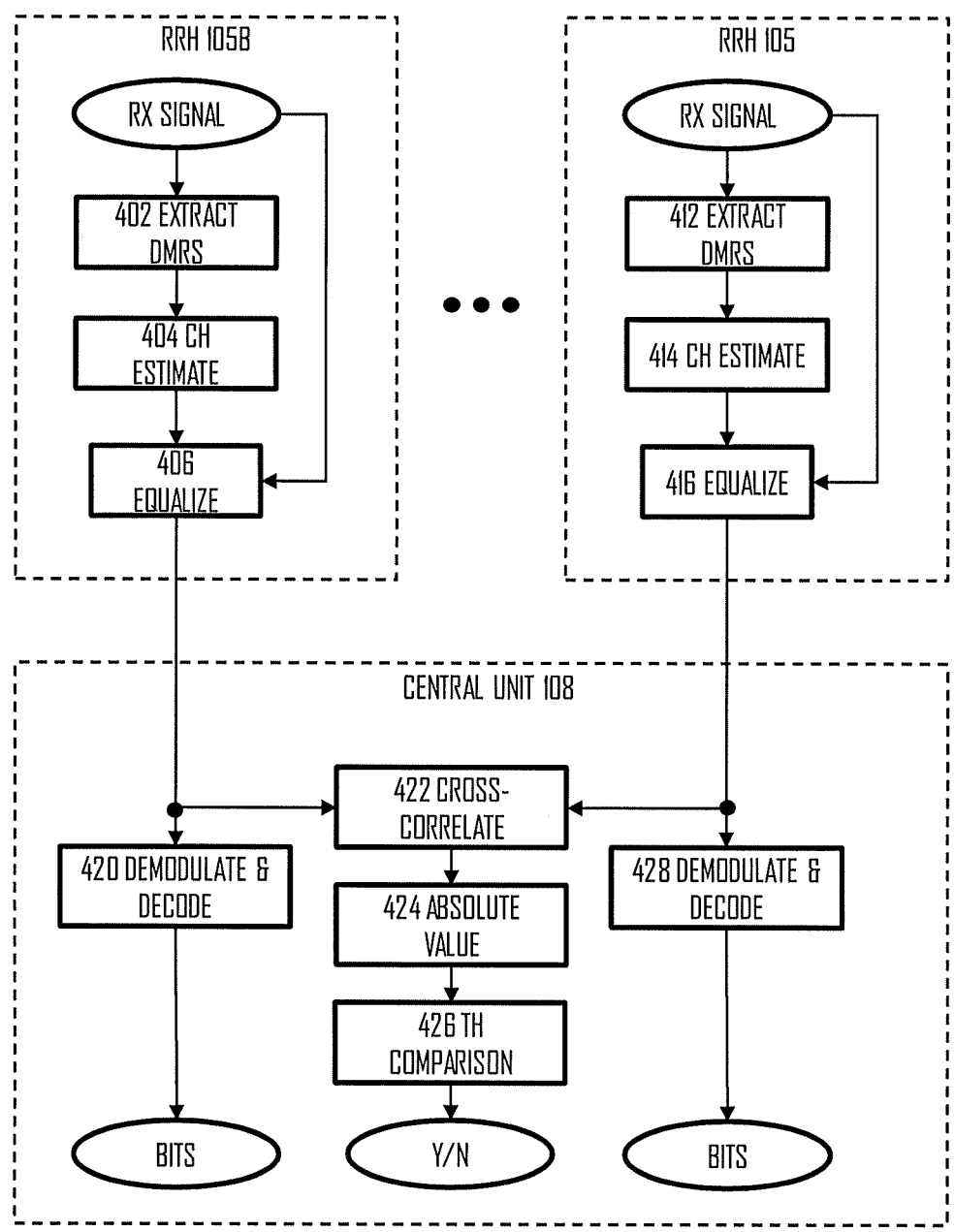
FIG. 4 illustrates an embodiment of a procedure for determining whether or not a radio head is capable of hearing a terminal device served by another radio head.

FIG. 4 illustrates an embodiment of the procedure of FIG. 3 in greater detail. FIG. 4 describes operations performed in the RRHs 104 to 104B and operations performed in the CU 108. Let us assume that RRH 105 is currently serving the terminal device 100 while the RRH 105B is simultaneously serving the terminal device 102 and that both RRHs 105, 105B have scheduled the same uplink time-frequency resource to the respective terminal devices 100, 102. All RRHs 105, 105B perform simultaneously reception in the same time-frequency resources and all receive a signal (RX signal). Referring to FIG. 4, the RRH 105 serving the terminal device 100 has scheduled an uplink time-frequency resource to the terminal device and receives a signal from the terminal device 100 in the scheduled time-frequency resource. The signal may be represented as:

$$Y_{105B} = H_{105B,102} \cdot X_{102} + H_{105B,100} \cdot X_{100} + n_i,$$

where $H_{105B,102} \in \mathbb{C}^{N_{sc} \times N_{sym}}$ is a frequency domain channel response between RRH 105B and the terminal device 102, $X_q \in \mathbb{C}^{N_{sc} \times N_{sym}}$ denotes the transmitted symbols by the terminal device 100, $n_{105B}$ is the noise-plus-interference, and $\circ$ denotes a Hadamard product. Assuming that only the terminal device 100 is in the coverage of RRH 105, the signal received by RRH 105 can be written as:

$$Y_j = H_{105,100} \cdot X_{100} + n_{105}$$

The received signal is then processed in the RRH 105 and 105B, wherein the processing may include extracting a demodulation reference signal, DMRS (block 402, 412) of the served terminal device, and a channel estimate between the served terminal device and serving RRH is computed by using the DMRS (block 404, 414). The channel estimate is then applied to an equalizer, optionally via an interpolation function, and the received signal is equalized in block 406, 416 based on the estimated channel. For RRH 105B serving the terminal device 102, the estimate is denoted by $\hat{H}_{105B,102}$, and the symbol estimates are as follows:

$$\hat{X}_{105B,102} = X_{102} + \tilde{H}_{105B,100} \cdot X_{100} + \tilde{n}_{105B},$$

where $\tilde{H}_{105B,100}$ is the interference channel distorted by the equalizer 416, the interference caused by the terminal device 100, and $\tilde{n}_{105B}$ represents the combined effect of noise and equalization errors on the signal from the terminal device 102. For RRH 105 not serving the terminal device 102, the equalizer output is correspondingly $\hat{X}_{105,100} = X_{100} + \tilde{n}_{105}$, with $\tilde{n}_{105}$ representing noise and equalization error on the signal from the terminal device 100. These signals are transferred to the central unit 108 for further processing.

In the central unit 108, conventional demodulation (symbol demapping) and decoding operations may be performed on the respective signals (in block 420, 428) to acquire information bits. After the decoding, the decoded information may be subjected to error detection such as a cyclic redundancy check (CRC) to detect whether or not the decoding was successful.

With respect to an embodiment of block 304, the signals $\hat{X}_{105,100}$ and $\hat{X}_{105B,102}$ received from the RRHs are subjected to the cross-correlation in block 422. A magnitude of the cross-correlation performed in block 422 may be obtained in block 424 by calculating $$C_{105B,105} |x_{105B,102}{}^H x_{105,100}|^2,$$

where $x_{105B,102} = \text{vec}(\hat{X}_{105B,102})$ and $x_{105} = \text{vec}(\hat{X}_{105,100})$. The function 'vec' represents arranging the signal into a vector form for the correlation. In case the RRH has employed spatial multiplexing and has received a signal from multiple terminal devices in the same time-frequency resource by employing spatial multiplexing, the equalized symbols of all the spatially multiplexed terminal devices, including the terminal device 100, may be summed together before calculating the cross-correlation in block 422. Identifying whether each of such terminal devices is a source of interference is described below with reference to FIG. 7. The Equation above represents a combination of the cross-correlation and the magnitude computation, thus combining blocks 422, 424 into the same Equation. The magnitude computed in block 424 may then be subjected to the threshold computation in block 426 (embodiment of block 306) where the magnitude is compared with a determined detection threshold (TH). The detection threshold may be selected appropriately, and the appropriate threshold value may be determined based on the required detection (or false alarm) probability, e.g. via experimentation or testing. If the absolute value exceeds the threshold, the central unit 108 may determine that the RRH 105B is receiving a signal from the terminal device 100, i.e. that the terminal device interferes with the RRH 105B not serving the terminal device 100. The central unit may then carry out interference control by changing one or more parameters of the terminal device 100 or the RRH 015 or 105B such that the interference is reduced. The interference control may comprise reducing the transmit power of the terminal device 100, changing a beamforming configuration of the terminal device 100 such that the terminal device 100 directs its transmission better away from the RRH 105B, or instructing the RRH 105 to change its beamforming configuration such that a reception null is directed towards the terminal device 100. Other interference control actions may be performed in other embodiments.

In an embodiment where the RRHs are synchronized with one another, the cross-correlation may be simplified into a dot product between the equalized signals.

Figure 5:
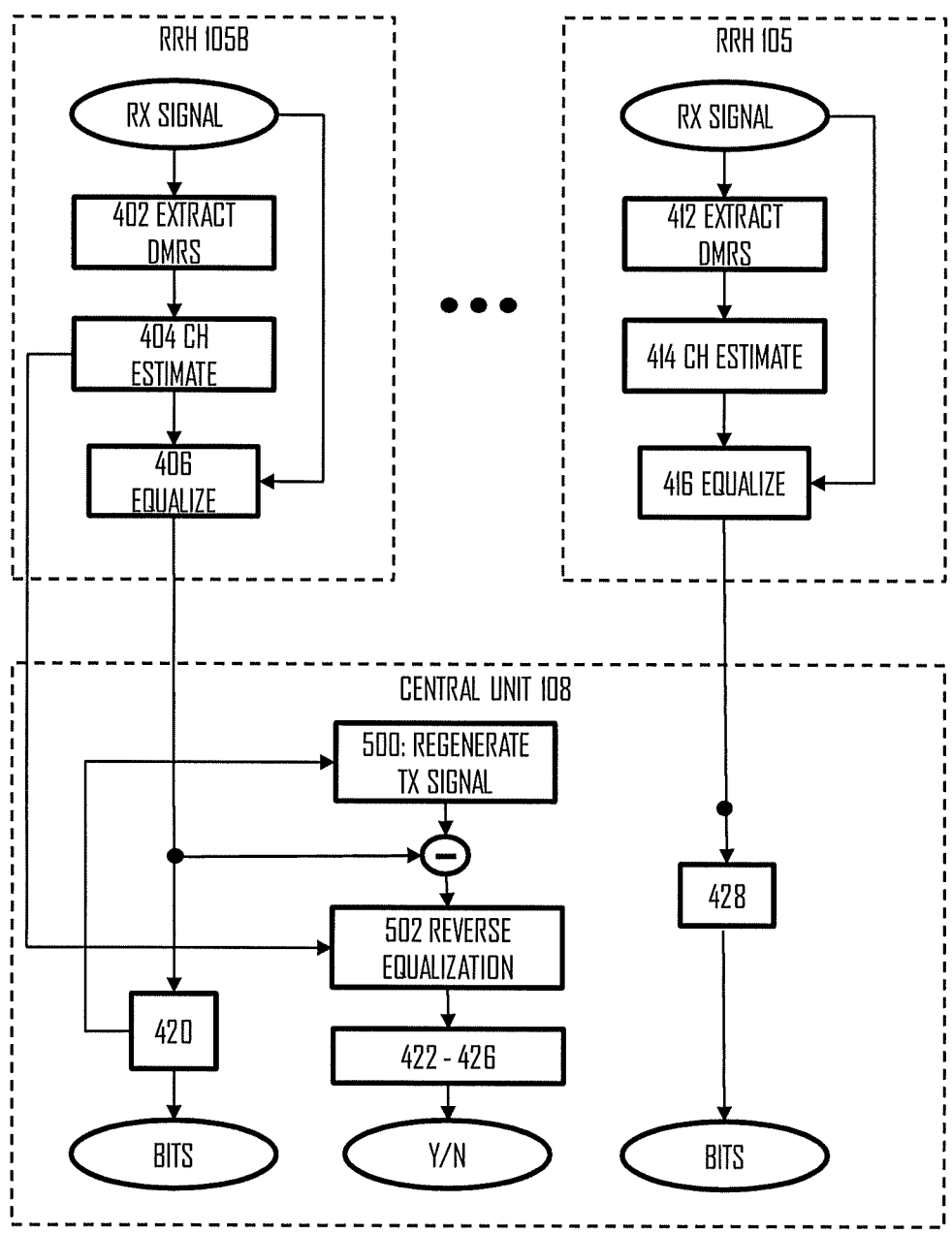
FIG. 5 illustrates an embodiment for improving the performance of the procedure of FIG. 4.

FIG. 5 illustrates another embodiment of FIG. 3. In FIG. 5, a successive interference cancellation (SIC) is performed to reduce interference degrading the performance of the cross-correlation, thus providing an improved performance with respect to the embodiment of FIG. 4. In the embodiment of FIG. 5, the network node (the central unit 108) removes, for the purpose of the cross-correlation, the signal of the served terminal device, thus performing interference cancellation to improve the cross-correlation. Additionally, or alternatively, the embodiment includes reversing the equalization from the signal applied to the cross-correlation. The equalization is made for the served terminal device, thus distorting the signal of the non-served terminal device and reducing performance of the cross-correlation. Reversing the equalization restores the signal from the non-served terminal device into a better form for the cross-correlation.

Referring to FIG. 5, the functions denoted by the same reference numbers as in FIG. 4 represent the same or substantially similar functions. Accordingly, the operation of the RRHs 105 to 105B may be similar to that described above. The only difference may be that the RRH 105B may output the equalization parameters to the central unit for the reverse equalization operation described below. Let us then describe the operation of the central unit 108 in this embodiment.

The information bits from served terminal device are decoded in block 420 and CRC or similar error detection is performed. If the error detection indicates that the information bits have been successfully recovered, the central unit may trigger the SIC procedure to improve the performance of the cross-correlation. If error detection indicates that residual errors in the information bits remain, the SIC may be disabled and the procedure of FIG. 4 may be followed. In another embodiment, even the cross-correlation procedure may be disabled, at least for the particular set of information bits. The set of information bits may be comprised in a transmission time interval or another set of time-frequency resources.

If the SIC is enabled, the central unit may reconstruct the original transmit signal of the terminal device 102 served by the RRH 105B in block 500 as follows:

$$X_{102} = TX(b_{102}),$$

where $TX(\cdot)$ denotes the transmit operations to the point of providing the symbols, e.g. channel encoding and modulation or symbol-mapping), and $b_{102}$ is the recovered information bit sequence in block 420. The next step is to subtract this regenerated signal from the equalized signal (as indicated by the subtract operation in FIG. 5), which will ideally remove the desired signal, leaving only noise and interference (including the interfering signal from the terminal device 100, if present). Recalling that $\hat{X}_{105B,102} = X_{102} + \tilde{H}_{105B,100} \cdot X_{100} + \tilde{n}_{105B}$, we can write:

$$X_{105B,SIC} = \hat{X}_{105B,102} - X_{102} = \tilde{H}_{105B,100} \cdot X_{100} + \tilde{n}_{105B}$$

As described above, in an embodiment the effects of equalization in block 406 are removed from this signal in order to enhance the quality of the correlation metric. The reverse equalization may be carried out in block 502 as follows:

$$Y_{105B,SIC} = \tilde{H}_{105B,102} \cdot X_{105B,SIC} \approx H_{105B,100} \cdot X_{100} + n_{105B},$$

where the latter form stems from the fact that $\tilde{H}_{105B,100}$ and $\tilde{n}_{105B}$ represent the output of the equalizer 406, while multiplication by $\hat{H}_{105B,102}$ (approximately) reverses the equalization in block 406. This procedure provides the effect that the effective channel of the interfering terminal device 100 consists mainly of its own physical (radio) channel, and not its equalized version. This may improve the quality of the cross-correlation metric by removing some of the amplitude variations caused by the equalization from the signal.

Thereafter, the procedure may follow the blocks 422 to 426 described above, with some modifications to the above-described notation, e.g. the improved magnitude of the correlation value can be obtained as:

$$C_{105B,105,SIC} = |y_{105B,SIC}^H x_{105,100}|^2,$$

where $y_{105B,SIC} = \text{vec}(Y_{105B,SIC})$.

Figure 6:
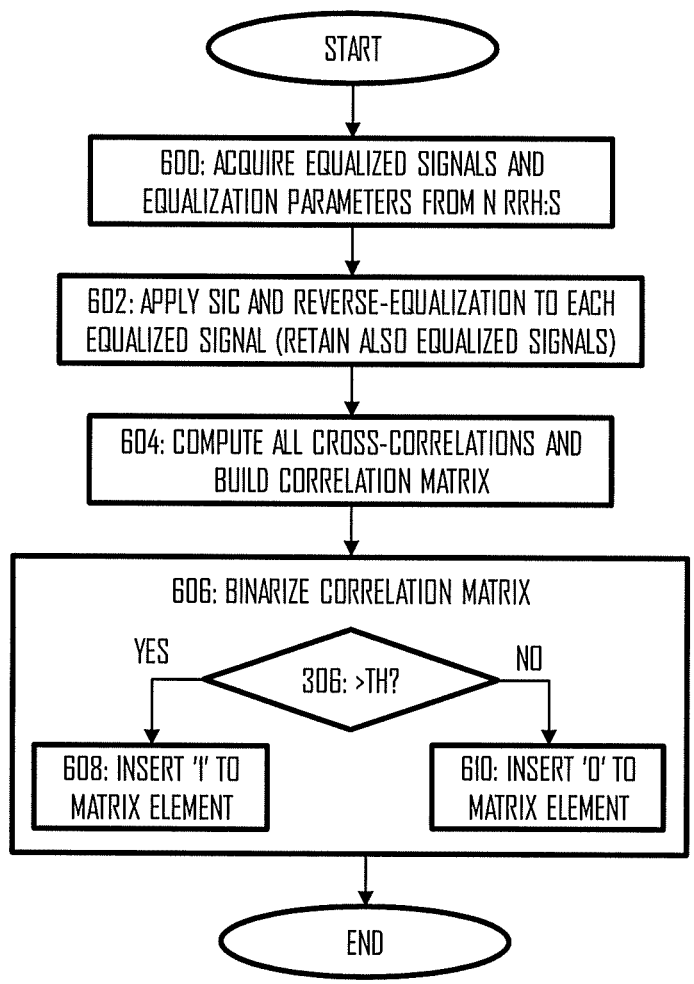
FIG. 6 illustrates an embodiment of a procedure for building a correlation model across multiple radio heads and multiple terminal devices.

FIGS. 4 and 5 illustrate the embodiments for the purpose of determining whether or not the RRH 105B is capable of hearing the terminal device 100. This is for the purpose of simplified description. The central unit 108 may perform the corresponding procedures for the purpose of determining whether or not the RRG 105 is capable of hearing the terminal device 102. A similar procedure may be performed for all RRHs managed by the central unit 108, including the RRH 105A and for all or further terminal devices served by the RRHs. In such manner, a detection matrix may be formed on the basis of the cross-correlation values the terminal devices are denoted in the rows of the matrix and the RRHs in columns of the matrix (or vice versa). The detection matrix indicates which RRHs are capable of hearing which terminal devices. In such manner, the coverage area of each terminal device may be charted. FIG. 6 illustrates an embodiment of a procedure for creating such a cross-correlation matrix indicating coverage areas of the terminal devices served by the RRHs of the central unit 108.

Referring to FIG. 6, the central unit may acquire the equalized signals (and equalization parameters) from N RRHs managed by the central unit (block 600). The equalization parameters may include the channel estimates or equalization coefficients for each equalization. In embodiments where the reverse equalization is omitted, the equalization parameters need not be acquired. In block 602, the central unit applies the SIC (and reverse-equalization) to the equalized signals while retaining the equalized signals as well, as described above in connection with FIG. 5. Then, the central unit may compute the cross-correlations for the different pairs of an RRH and terminal device not served by the RRH, to determine for each RRH whether or not the RRH is capable of hearing each terminal device not served by the RRH. On the basis of the cross-correlations, the following correlation matrix may be built:

$$R = \begin{bmatrix} 1 & C_{12} & \cdots & C_{1N} \\ C_{21} & 1 & \cdots & C_{2N} \\ \vdots & \vdots & \ddots & \vdots \\ C_{N1} & C_{N2} & \cdots & 1 \end{bmatrix}$$

where the indexing starts from 1 without loss of generality. Since the diagonal elements can be ignored, because they represent the terminal device served by the respective RRH, obtaining this matrix involves N(N−1) correlations. However, the necessary data for this can be collected within a single TTI, meaning that the full correlation matrix can be calculated in the order of milliseconds. A condition may be that all the terminal devices involved in the correlation matrix perform a transmission within the single TTI.

While the correlation matrix R above still contains the (magnitude) of cross correlations, e.g. soft information regarding the magnitude of the correlation, the final output of the procedure may be a binary matrix showing the terminal devices heard by the different RRHs. The correlation matrix may be binarized in block 606 can be obtained as a result of the threshold comparison in block 306 represented by:

$$C = \begin{bmatrix} 1 & C_{12} > C_{TH} & \cdots & C_{1N} > C_{TH} \\ C_{21} > C_{TH} & 1 & \cdots & C_{2N} > C_{TH} \\ \vdots & \vdots & \ddots & \vdots \\ C_{N1} > C_{TH} & C_{N2} > C_{TH} & \cdots & 1 \end{bmatrix}$$

where > denotes the 'greater than' operator in the Boolean sense, such that the output is 1 if $C_{ij} > C_{TH}$ is true. This binary matrix essentially tells if at least one terminal device of another RRH is in the coverage area of a given RRH on the same frequency band. Referring to block 606 of FIG. 6, if the comparison in block 306 results in the cross-correlation value $C_{ij}$ being greater than the threshold $C_{TH}$, the procedure may proceed to block 608 where the respective element $C_{ij}$ in the correlation matrix is replaced by T. If the comparison in block 306 results in the cross-correlation value $C_{ij}$ being lower than the threshold $C_{TH}$, the procedure may proceed to block 610 where the respective element $C_{ij}$ in the correlation matrix is replaced by '0'. As a result, a binary correlation matrix is acquired for the purpose of the interference management in block 308.

Figure 7:
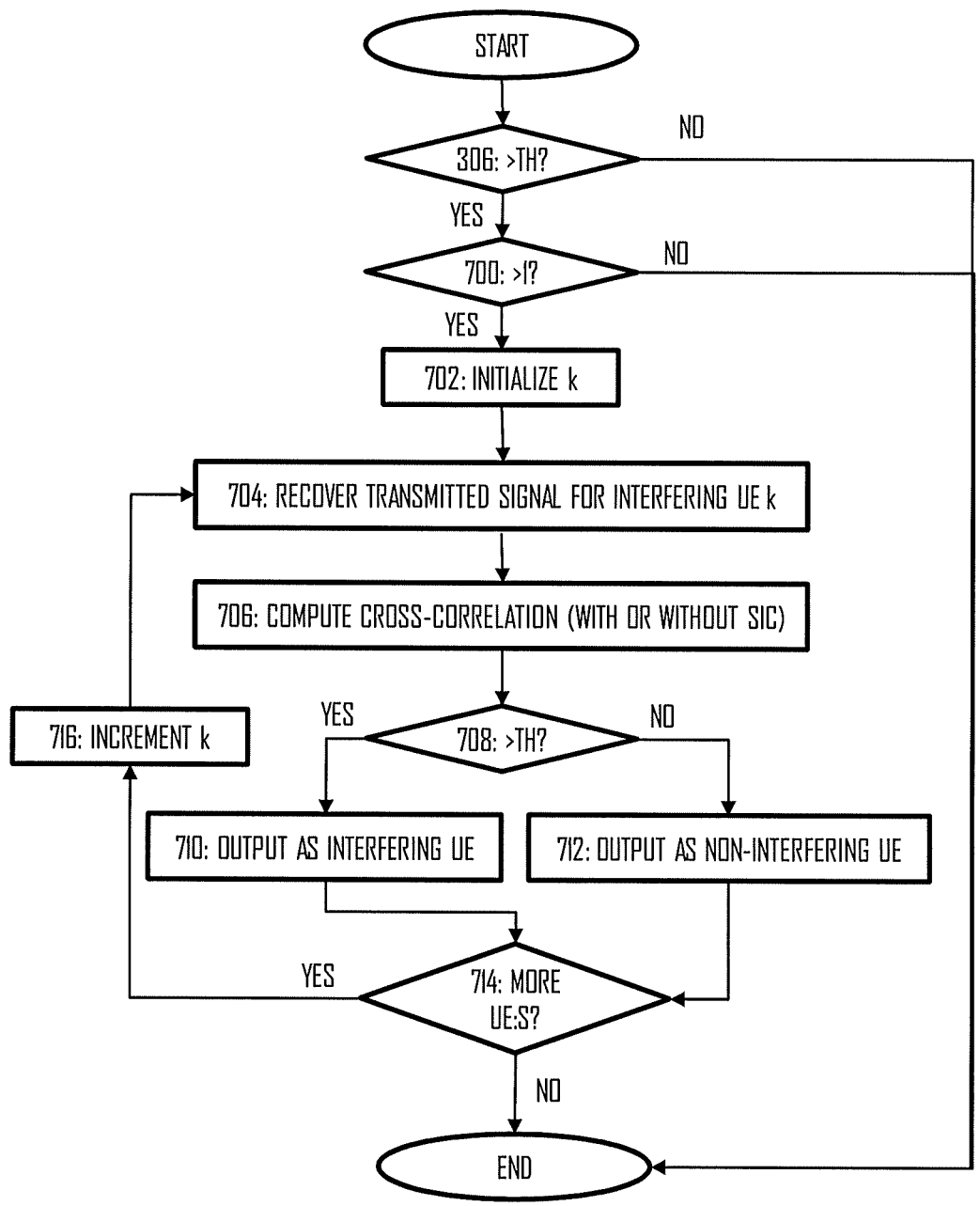
FIG. 7 illustrates an embodiment of a procedure for parsing spatial multiplexing in any one of the embodiments of FIGS. 3 to 6.

The correlation matrix may indicate the interfering terminal device directly in the above-described manner when there is no spatial multiplexing in the RRH serving the interfering terminal device. However, if the RRH serving the interfering terminal device employs spatial multiplexing in the time-frequency resources where the interfering terminal device transmits the signal used in the cross-correlation, further analysis may be performed to distinguish whether or not there are multiple interfering terminal devices allocated to the same time-frequency resource in the RRH serving the interfering terminal device. FIG. 7 illustrates a procedure for taking the spatial multiplexing into account in the cross-correlation.

Referring to FIG. 7, the procedure may proceed in the above-described manner until block 306 (or 426 in the embodiment of FIG. 4 or 5). If the cross-correlation indicates correlation below the threshold, no interfering terminal devices have been detected and the process may end. Otherwise, the procedure may proceed to block 700 where it is determined whether or not more than one terminal device has been spatially multiplexed into the same time-frequency resources at the RRH serving the terminal device for which the greater-than-threshold cross-correlation was detected in block 306. If there was no spatial multiplexing, the procedure may end. Otherwise, the central unit may proceed to more detailed analysis for determining whether or not the other terminal device(s) spatially multiplexed with the interfering terminal device is/are also interfering terminal device(s). Index k is initialized in block 702, k indicating a potentially interfering terminal device spatially multiplexed with the interfering terminal device. In block 704, the information bits transmitted by the terminal device k in the spatially multiplexed time-frequency resource are acquired and processed into a transmitted signal $X_k=TX(b_k)$ formed via the TX function described above, e.g. channel encoding and modulation procedures. Similarly, the signal received by the interfered RRH and used in the cross-correlation for the purpose of block 306 that triggered block 700 is recovered for the cross-correlation (e.g. $Y_{105B,SIC}$ described above). Then, cross-correlation between the two signals is computed in block 706 to determine whether or not the signal $X_k$ is present in signal $Y_{105B,SIC}$, i.e. whether or not the terminal device k is also an interfering terminal device. The comparison with the threshold $C_{TH}$ is performed in block 708, and the threshold may be the same as in block 306. If the magnitude of the cross-correlation is greater than the threshold, the terminal device k may be indicated in the correlation matrix as an interfering terminal device (block 710). If the magnitude is lower than the threshold, the terminal device k may be indicated in the correlation matrix as a non-interfering terminal device (block 712). The spatial multiplexing may require adding another dimension to the correlation matrix. Then, the process may proceed to block 714 where it is determined whether or not there is more spatially multiplexed terminal devices that have not yet been taken into account. If yes, the process may proceed to block 716 where k is incremented and the process may return to block 704 for the next terminal device. If all the spatially multiplexed terminal device have been considered, the process may end.

Figure 8:
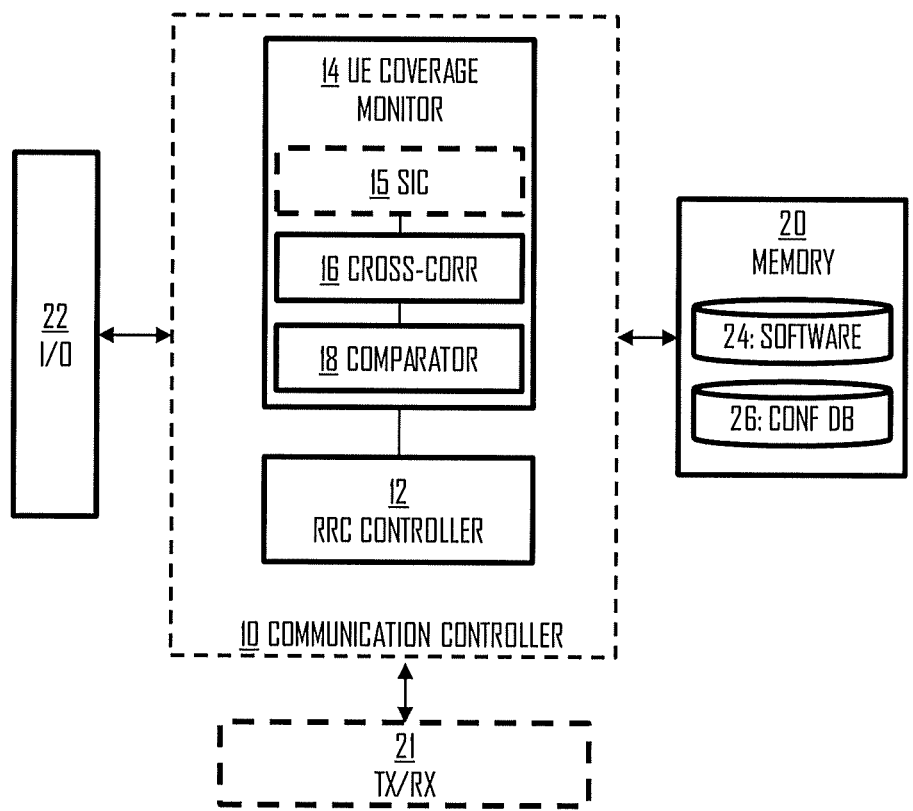
FIG. 8 illustrates a block diagram of a structure of an apparatus according to an embodiment of the invention.

FIG. 8 illustrates an embodiment of a structure of the above-mentioned functionalities of an apparatus executing the functions of the central unit (a network node) in the embodiments described above, e.g. the process of FIG. 3 or any one of embodiments thereof. As described above, the apparatus for the network node may be configured to determine the coverage areas of the terminal devices in a cell or cells controlled by the network node via multiple RRHs. In an embodiment, the apparatus may be a circuitry or an electronic device realizing some embodiments of the invention in the network node. The apparatus carrying out the above-described functionalities may thus be comprised in such a device, e.g. the apparatus may comprise a circuitry such as a chip, a chipset, a processor, a micro controller, or a combination of such circuitries for the network node.

Referring to FIG. 11, the apparatus may comprise a communication controller 10 providing the apparatus with capability of performing the above-described functions of the network node. In some embodiments, the apparatus may comprise a communication interface or communication circuitry 22 to communicate with the RRHs. The interface 22 may operate according to the specifications of the F1 interface of 5G networks, for example. However, in some embodiments the above-described procedures may be performed by another network node of the radio access network or the core network and, in such embodiments, the interface 22 may support another communication protocol. In any case, the network node may acquire the equalized signals for the purpose of the cross-correlation via the interface 22.

In some embodiments, the apparatus comprises a second communication interface 21 configured to provide the apparatus with capability of communicating towards the core network 110. In some embodiments, the communication interface 21 may also be used to communicate with the other network nodes via wired connections. In the context of 5G networks, the communication interface 22 may be configured for communication over an Xn interface, and/or an NG interface.

The communication controller 10 may comprise at least one processor or a processing circuitry. The apparatus may further comprise a memory 20 storing one or more computer program products 24 configuring the operation of said processor(s) of the apparatus. The memory 20 may be implemented using any suitable data storage technology, such as semiconductor-based memory devices, flash memory, magnetic memory devices and systems, optical memory devices and systems, fixed memory and removable memory. The memory 20 may further store a configuration database 26 storing operational configurations of the apparatus, e.g. the correlation matrix described above and/or the threshold value(s) for the comparison.

The communication controller may comprise an RRC controller 12 configured to establish, manage, and terminate radio connections between the network node and the terminal devices connected to the network node. The RRC controller 12 may operate under a control of RRC functions that make the decisions of RRC actions such as the handovers. The RRC controller 12 may also perform the interference management described above. The interference controller may receive, as an input, the information on the coverage of terminal devices, e.g. the correlation matrix. The RRC controller may also instruct a coverage monitor circuitry 14 to determine the coverage areas of the terminal devices according to any one of the above-described embodiments.

The coverage monitor circuitry 14 may comprise a SIC circuitry configured to perform block 500 (and the subtraction) and, optionally, block 502 of FIG. 2 to 'clean' the signal for the cross-correlation by a cross-correlation circuitry 16. The cross-correlation circuitry may perform block 304 or 422 and 424, and/or any other cross-correlation function described above. The cross-correlation result may be output to a comparator circuitry 18 configured to perform block 306 (and 708), as described above. In such manner, the coverage monitor circuitry 14 may compute the cross-correlations between the terminal devices and the RRHs and output the information to the RRC controller for the interference management.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 3 to 7 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a network node of a radio access network, comprising circuitry configured to perform:
acquiring a first equalized signal representing a signal received by a first radio head serving a terminal device, the first equalized signal comprising a signal received by the first radio head from the terminal device;
acquiring a second equalized signal representing a signal received by a second radio head not serving the terminal device, wherein the second radio head is spatially distant from the first radio head;
cross-correlating the first equalized signal with the second equalized signal and determining, on the basis of said cross-correlating, whether or not the second equalized signal also comprises a signal received from the terminal device; and
as a result of the second equalized signal being determined to comprise the signal received from the terminal device, causing execution of an interference management action.

2. The apparatus of claim 1, wherein the network node is an access node, and the first radio head and the second radio provide the access node with a spatially distributed multiple-input-multiple-output communication capability.

3. The apparatus of claim 1, wherein said determining comprises determining whether or not the same signal transmitted by the terminal device is received in the first radio head and in the second radio head.

4. The apparatus of claim 1, wherein the first equalized signal is other than a reference signal.

5. The apparatus of claim 1, wherein the first radio head is synchronized with the second radio head, and the circuitry is configured to preform said cross-correlating by computing a dot product between the first equalized signal and the second equalized signal.

6. The apparatus of claim 1, wherein the circuitry is configured to compare a magnitude of a result of said cross-correlating with a threshold value and perform said determining on the basis of said comparing, wherein if the magnitude is greater than the threshold, the circuitry is configured to determine that second equalized signal also comprises the signal received from the terminal device.

7. The apparatus of claim 1, wherein said terminal device is a first terminal device, wherein the second equalized signal comprises a signal received by the second radio head from a second terminal device served by the second radio head, and wherein the circuitry is further configured to perform:
decoding the second equalized signal and, after said decoding, reconstructing a signal transmitted by the second terminal device;
subtracting the reconstructed signal from the second equalized signal; and
performing said cross-correlating between the reconstructed signal and the first equalized signal.

8. The apparatus of claim 7, wherein the circuitry is configured to determine, by using error detection, whether or not the decoding results in residual error and to disable said reconstructing upon determining that the decoding results in residual error.

9. The apparatus of claim 1, wherein the circuitry is configured to acquire equalization parameters used when equalizing the signal received by the second radio head, to perform a reverse equalization operation on the second equalized signal by using the equalization parameters, and to perform said cross-correlating between the reverse-equalized signal and the first equalized signal.

10. The apparatus of claim 1, wherein the circuitry comprises at least one processor and at least one non-transitory memory including computer program code, the at least one memory and computer program code configured to, with the at least one processor, cause the performance of the apparatus.

11. A method for a network node of a radio access network, comprising:
- acquiring, by the network node, a first equalized signal representing a signal received by a first radio head serving a terminal device, the first equalized signal comprising a signal received by the first radio head from the terminal device;
- acquiring, by the network node, a second equalized signal representing a signal received by a second radio head not serving the terminal device, wherein the second radio head is spatially distant from the first radio head;
- cross-correlating, by the network node, the first equalized signal with the second equalized signal and determining, on the basis of said cross-correlating, whether or not the second equalized signal also comprises a signal received from the terminal device; and
- as a result of the second equalized signal being determined to comprise the signal received from the terminal device, causing by the network node execution of an interference management action.

12. The method of claim 11, wherein said terminal device is a first terminal device, wherein the second equalized signal comprises a signal received by the second radio head from a second terminal device served by the second radio head, and wherein the method further comprises as performed by the network node:
- decoding the second equalized signal and, after said decoding, reconstructing a signal transmitted by the second terminal device;
- subtracting the reconstructed signal from the second equalized signal; and
- performing said cross-correlating between the reconstructed signal and the first equalized signal.

13. The method of claim 11, further comprising:
- acquiring equalization parameters used when equalizing the signal received by the second radio head,
- performing a reverse equalization operation on the second equalized signal by using the equalization parameters, and
- performing said cross-correlating between the reverse-equalized signal and the first equalized signal.

14. The method of claim 11, wherein the network node is a Central Unit of specifications of Third Generation Partnership Project, 3GPP.

15. A computer program product embodied on a non-transitory computer-readable medium and comprising a computer program code readable by a computer, wherein the computer program code configures the computer to carry out a computer process in a network node of a radio access network, the computer process comprising:
- acquiring a first equalized signal representing a signal received by a first radio head serving a terminal device, the first equalized signal comprising a signal received by the first radio head from the terminal device;
- acquiring a second equalized signal representing a signal received by a second radio head not serving the terminal device, wherein the second radio head is spatially distant from the first radio head;
- cross-correlating the first equalized signal with the second equalized signal and determining, on the basis of said cross-correlating, whether or not the second equalized signal also comprises a signal received from the terminal device; and
- as a result of the second equalized signal being determined to comprise the signal received from the terminal device, causing execution of an interference management action.

* * * * *